(12) United States Patent
Laro et al.

(10) Patent No.: US 10,222,495 B2
(45) Date of Patent: Mar. 5, 2019

(54) SEISMIC SHAKER

(71) Applicant: MI-HOLDING BV, Eindhoven (NL)

(72) Inventors: Dick Laro, Breda (NL); Enrique Van De Groes, Eindhoven (NL)

(73) Assignee: MI-HOLDING BV, Eindhoven (NL)

( * ) Notice: Subject to any disclaimer, the term of this patent is extended or adjusted under 35 U.S.C. 154(b) by 220 days.

(21) Appl. No.: 14/896,131

(22) PCT Filed: Jun. 4, 2014

(86) PCT No.: PCT/NL2014/050355
§ 371 (c)(1),
(2) Date: Dec. 4, 2015

(87) PCT Pub. No.: WO2014/196858
PCT Pub. Date: Dec. 11, 2014

(65) Prior Publication Data
US 2016/0124097 A1 May 5, 2016

(30) Foreign Application Priority Data
Jun. 4, 2013 (NL) ...................................... 2010909

(51) Int. Cl.
G01V 1/155 (2006.01)
G01V 1/04 (2006.01)

(52) U.S. Cl.
CPC ................ G01V 1/155 (2013.01); G01V 1/04 (2013.01)

(58) Field of Classification Search
CPC .......... G01V 1/04; G01V 1/155; G01V 1/005; G01V 1/143; G01V 1/133; G01V 1/047;
(Continued)

(56) References Cited

U.S. PATENT DOCUMENTS 3,854,118 A * 12/1974 Pelton ...................... G01V 1/04
367/190
7,929,380 B2 * 4/2011 Wei ......................... G01V 1/005
367/190
(Continued)

FOREIGN PATENT DOCUMENTS

EP 2 549 300 A1 1/2013
EP 2549300 A1 * 1/2013 ............. G01V 1/155
(Continued)

OTHER PUBLICATIONS

International Search Report, dated Oct. 8, 2014, from corresponding PCT application.

*Primary Examiner* — Isam A Alsomiri
*Assistant Examiner* — Amie M Ndure
(74) *Attorney, Agent, or Firm* — Young & Thompson

(57) ABSTRACT

A seismic shaker for exercising an excitation force on the ground has a base plate and a reaction mass connected to the base plate via a resilient structure and an actuator parallel thereto. A first comparison unit sends a difference signal which is the difference between a displacement measured by a displacement sensor and a set value of the displacement. A control unit calculates a correction value as a function of this difference signal, and sends it to a second comparison unit, which adds the correction value to a value of the excitation force to be exerted set in the second comparison unit. This second comparison unit is connected to a controller unit which controls the actuator. At Low frequency this position control will track the ground force through the position set-point. The position feedback loop will be able to suppress the interfering force of the spring and any hysteresis.

2 Claims, 1 Drawing Sheet

(58) Field of Classification Search
CPC .......... G01V 1/135; G01V 1/159; G01V 1/02; G01V 1/145; G01V 1/147; G01V 1/003; G01V 1/053; G01V 1/362
USPC .......................................................... 367/190
See application file for complete search history.

(56) References Cited

U.S. PATENT DOCUMENTS

| | | | |
|---|---|---|---|
| 2005/0267695 A1* | 12/2005 | German | G01N 3/30 702/41 |
| 2009/0073807 A1* | 3/2009 | Sitton | G01V 1/005 367/38 |
| 2010/0276224 A1* | 11/2010 | Wei | G01V 1/047 181/121 |
| 2012/0271551 A1* | 10/2012 | Wei | G01V 1/0475 702/17 |
| 2014/0204701 A1* | 7/2014 | Teyssandier | G01V 1/04 367/7 |
| 2014/0305732 A1* | 10/2014 | Tulett | G01V 1/0475 181/112 |
| 2015/0198728 A1* | 7/2015 | Ollivrin | G01V 1/005 702/14 |
| 2015/0309195 A1* | 10/2015 | Sallas | G01V 1/005 367/49 |

FOREIGN PATENT DOCUMENTS

| | | | | |
|---|---|---|---|---|
| GB | 2 043 896 A | 10/1980 | | |
| GB | 2043896 A | * | 10/1980 | G01V 1/04 |

\* cited by examiner

SEISMIC SHAKER

FIELD OF THE INVENTION

For seismic monitoring and exploration of oil and gas reserves more and more seismic shakers are used to vibrate the ground instead of dynamite because the behavior of the latter is variable and difficult to control. Moreover dynamite should not be used in urban areas and environmentally sensitive areas. The current hydraulic seismic shakers are limited in that they can generate no signals less than about 5 Hz.

The invention relates to a seismic shaker for exerting an excitation force on the ground, comprising:
- a base plate for placement on the ground through which the excitation force is exerted on the ground,
- a reaction mass,
- a resilient construction and parallel thereto an actuator through which the reaction mass is connected to the base plate,
- a controller unit which is connected to and controls the actuator,
- a sensor measuring a parameter of the motion of the reaction mass relative to the base plate and connected to the controller unit,
- a first comparison unit which is present between the controller unit and the sensor, and that sends a difference signal that is equal to the difference between the measured value of the parameter, and a value of the parameter set in the first comparison unit,
- a control unit which is present between the first comparison unit and the controller unit, and that as a function of the difference signal computes a correction value, and
- a second comparison unit which is present between the control unit and the controller unit, and sends out a sum signal which is equal to the sum of the correction value and a desired value of the excitation force to be exerted set in the second comparison unit.

The resilient structure constitutes a suspension of the reaction mass to compensate the gravity force exerted on the reaction mass. The actuator can be a hydraulic actuator or an electromechanical actuator (linear synchronous motor).

On the basis of the desired ground forces acceleration and displacement of a reaction mass of the seismic shaker can be calculated. The transmissibility of the ground is measured with a combination of sensors on the seismic shaker and on the ground. The reproducibility of the excitation signals is important to be able to detect changes in the ground.

STATE OF THE ART

Such a seismic shaker is generally known. In the known seismic shaker, the said parameter is the acceleration of the reaction mass, and the said sensor being an accelerometer. In the known seismic shaker the measured acceleration is used to verify and control the force. A disadvantage of accelerometers is that in the low frequency region they have a poor signal-to-noise ratio, eliminating the compensation of the low-frequency interference power caused by the spring. Furthermore, accelerometers have the disadvantage that they exhibit a non-linear behavior and do not possess the ability to compensate resonance as a result of the resilient construction, The spring suspension results in a resonance frequency (natural frequency of the mass-spring-damper system) of 1.2 Hz and disrupts the desired force profile. Thus, a desired excitation signal (sweep) from 1 to 200 Hz, will always jog the resonance frequency so that the seismic measurement is disturbed by these uncontrolled resonance response. A further disadvantage is that in addition to spring stiffness a hysteresis loop is measured which interferes with the desired force required for seismic metering.

The generation of low frequencies is required for different kinds of seismic surveys. Because the well-known seismic shakers cannot generate low frequencies such investigations cannot be performed adequately. Thus, there is a need for a controllable seismic shaker that is able to generate the low frequencies, and which does not exhibit non-linear behavior and can compensate for the resonance.

SUMMARY OF THE INVENTION

An object of the invention is to provide a seismic shaker of the type described in the opening paragraph which is able to generate low frequency signals. To this end, the seismic shaker in accordance with the invention is characterized in that the sensor is a displacement sensor and the parameter is the displacement of the reaction mass. The seismic shaker according to the invention is provided with a control loop which is based on displacement feedback and not on acceleration feedback. Accelerometers in the low frequency area cause problems (drift, bounce). In contrast thereto, displacement meters operate in the low frequency area without problems and are therefore in this area better than accelerometers.

The control introduces, as a function of the desired acceleration signal, a pressure—in the case of a hydraulic actuator—or a voltage—in case of an electromechanical actuator—moving the reaction mass. By calculating the displacement from the desired ground force profile and closing the control over position, at low-frequencies the effects of the spring can be suppressed and the right forces are sent into the ground.

Since a displacement meter is more stable and has a better low-frequency performance than an accelerometer, a seismic shaker provided with a position control unit (position feedback) does not show the above-described drawbacks. As a result, a sweep, which includes frequencies from a value below the resonance frequency, can be exerted without exciting the resonance frequency. With the new advanced control and set-point strategy the range has broadened from 5-200 Hz to 1-200 Hz or even below 1 Hz. This offers new opportunities for seismic measurements.

The disadvantage of a relative position control is that it will not generate the correct force at high frequencies. Firstly, the control is limited in bandwidth due to dynamics. Secondly, the feedback will be influenced by the movements of the ground because of the position sensor measures relative to the ground what leads to a wrong correction signal. In order to also be able to generate, accurately the desired power in the high frequency range, one embodiment of the seismic shaker in accordance with the invention is characterized in that it further comprises a first accelerometer which is coupled to the reaction mass and a second accelerometer which is coupled to the base plate, as well as a further control unit which is connected to the accelerometers and the second comparison unit and that as a function of the measured accelerations, computes a further correction value and sends it to the second comparison unit which adds this further correction value to the desired value of the excitation force to be exerted set in the second comparison unit.

This embodiment of the seismic shaker is provided with a further control loop which is based on acceleration feedback. In the high-frequency area, this further control loop is activated and the above-described displacement-based control loop is switched off, as acceleration transducers, work better in the high frequency area than displacement transducers. To the desired value of the excitation force to be exercised set in the second comparison unit, a correction value is added in order to compensate the part of the excitation force which is received by the seismic shaker as a result of the spring rigidity of the seismic shaker. At low frequencies, the position control will track the ground force through the position setpoint. Outside the bandwidth the position control feed forward open loop will inject the force. The position feedback loop will be able to suppress the interfering force of the spring and any hysteresis.

BRIEF DESCRIPTION OF THE DRAWINGS

Below, the invention will be elucidated on the basis of an exemplary embodiment shown in the drawings of the seismic shaker according to the invention in more detail. In these drawings.

DETAILED DESCRIPTION OF THE DRAWINGS

Figure 1:
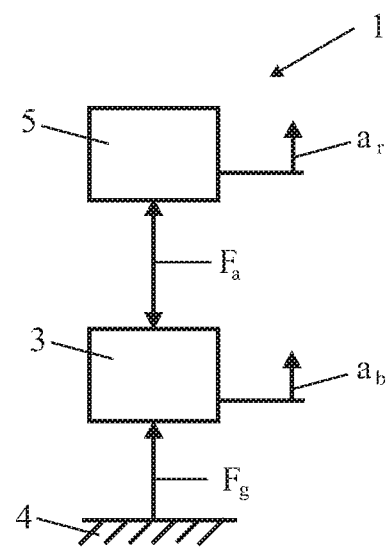
FIG. 1 is a one-dimensional dynamic model of a seismic shaker.

FIG. 1 schematically shows a one-dimensional dynamic model of the seismic shaker 1 according to the invention, in which a base plate 3 is present on the ground 4, and a reaction mass 5 is present above the base plate and is attached to the base plate. A linear motor generates the force $F_a$, acting on the base plate 3 and the reaction mass 5. The force $F_g$ acts on the ground is: $m_r \cdot a_r + m_b \cdot a_b$ wherein $a_r$ is the acceleration of the reaction mass and $a_b$ is the acceleration of the base plate and $m_r$ represents the mass of the reaction mass, and $m_b$ the mass of the base plate.

Figure 2:
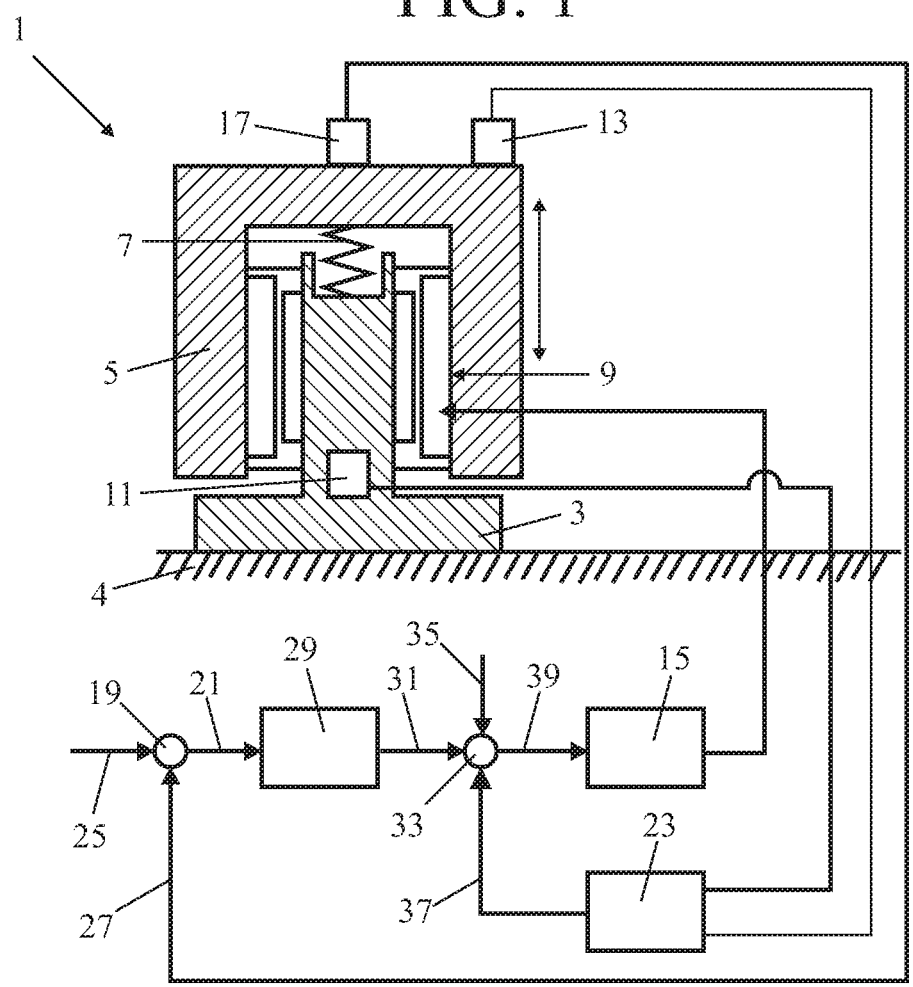
FIG. 2 is a schematic representation of the seismic shaker according to the invention.

FIG. 2 shows an embodiment of the seismic shaker according to the invention. The reaction mass 5 of the seismic shaker 1 is connected to the base plate 3 via a resilient structure 7 and an actuator 9 parallel thereto. In this case the actuator 9 is performed as a linear synchronous motor, and is much like the reaction mass 5 rotation-symmetric. The actuator is controlled by a controller unit 15.

The seismic shaker 1 is provided with accelerometers 11 and 13, which measure the acceleration of the reaction mass 5 and of the base plate 3, as well as of a displacement sensor 17, measuring the movement of the reaction mass 5.

The seismic shaker further has a first comparator unit 19, which is present between the controller unit 15 and the displacement sensor 17. This first comparison unit 19 sends a difference signal 21 which is the difference between the measured value 27 of the displacement and a first value 25 of the displacement set in the comparison unit 19.

A control unit 29 is present between the first comparison unit 19 and the controller unit 15, and calculates a correction value 31 as a function of the difference signal 21. This control unit 29 is a part of a control loop that adjusts the control of the actuator 9 and is designed as a position control unit.

Between the control unit 29 and the controller unit 15, a second comparison unit 33 is present that adds the correction value 31 to a desired value 35 of the excitation force to be exercised set in the second comparison unit and sends a sum signal 39 to the controller unit 15.

So at low-frequencies, this position control will track the ground force through the position setpoint. Outside the bandwidth of the position control the feed forward open loop will inject the force. Displacement transducers operate in the low frequency area without problems and are therefore in this area better than accelerometers.

A further control unit 23 is connected to the accelerometers 11 and 13 and to the second comparator unit 33, and calculates a further correction value 37 as a function of the measured accelerations, and sends it to the second comparison unit 33, which adds this further correction value 37 to the desired value 35 of the excitation force to be exercised set in the second comparator. In the high-frequency area, this further control loop is activated and the above-described displacement-based control loop is switched off, as acceleration transducers, work better in the high frequency area than displacement transducers.

Although the invention has been described in the foregoing based on the drawings, it should be observed that the invention is not by any manner or means restricted to the embodiment shown in the drawings. The invention also extends to all embodiments deviating from the embodiment shown in the drawings within the scope defined by the claims. For example, the seismic shaker may also be equipped with a so-called hold-down mass which is connected to the reaction mass, or which replaces it and which has a much larger mass than the reaction mass.

The invention claimed is:

1. A seismic shaker for exerting an excitation force on the ground, comprising:
   a base plate for placement on the ground through which the excitation force is exerted on the ground;
   a reaction mass;
   a resilient construction through which the reaction mass is connected to the base plate;
   an actuator parallel to the resilient construction and through which the reaction mass is connected to the base plate;
   a controller unit which is connected to and controls the actuator;
   a sensor measuring a parameter of the motion of the reaction mass relative to the base plate and connected to the controller unit;
   a first comparison unit which is present between the controller unit and the sensor, and that sends a difference signal that is equal to the difference between the measured value of the parameter, and a value of the parameter set in the first comparison unit;
   a control unit which is present between the first comparison unit and the controller unit, and that as a function of the difference signal computes a correction value; and
   a second comparison unit which is present between the control unit and the controller unit, and sends out a sum signal which is equal to the sum of the correction value and a desired value of the excitation force to be exerted set in the second comparison unit,
   wherein the sensor is a displacement sensor and the parameter is the displacement of the reaction mass.

2. The seismic shaker according to claim 1, further comprising:
   a first accelerometer which is coupled to the reaction mass;
   a second accelerometer which is coupled to the base plate; and
   a further control unit which is connected to the first and second accelerometers and the second comparison unit and that as a function of the measured accelerations, computes a further correction value and sends the computed further correction value to the second comparison unit which adds the computed further correction value to the desired value of the excitation force to be exerted set in the second comparison unit.

\* \* \* \* \*